(12) United States Patent
Baik et al.

(10) Patent No.: US 9,866,825 B2
(45) Date of Patent: Jan. 9, 2018

(54) MULTI-VIEW IMAGE DISPLAY APPARATUS AND CONTROL METHOD THEREOF

(71) Applicant: SAMSUNG ELECTRONICS CO., LTD., Suwon-si (KR)

(72) Inventors: Aron Baik, Seoul (KR); In-hak Na, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 14/326,086

(22) Filed: Jul. 8, 2014

(65) Prior Publication Data
US 2015/0092026 A1 Apr. 2, 2015

(30) Foreign Application Priority Data

Sep. 27, 2013 (KR) .................. 10-2013-0115326

(51) Int. Cl.
*H04N 13/04* (2006.01)
*H04N 13/00* (2006.01)

(52) U.S. Cl.
CPC ..... *H04N 13/0484* (2013.01); *H04N 13/0018* (2013.01); *H04N 13/047* (2013.01);
(Continued)

(58) Field of Classification Search
None
See application file for complete search history.

(56) References Cited

U.S. PATENT DOCUMENTS

| 8,358,335 B2 | 1/2013 | De La Barre et al. |
| 2007/0165037 A1 | 7/2007 | Ryu et al. |

(Continued)

FOREIGN PATENT DOCUMENTS

| CN | 102395039 A | 3/2012 |
| CN | 102998805 A | 3/2013 |

(Continued)

OTHER PUBLICATIONS

Communication, Issued by the European Patent Department, dated Jan. 23, 2015, In counterpart European Application No. 14160483.5.
Communication dated Jun. 21, 2017 issued by the State Intellectual Property Office of P.R. China in counterpart Chinese Patent Application No. 201410294958.6.

(Continued)

*Primary Examiner* — Christopher S Kelley
*Assistant Examiner* — Kaitlin A Retallick
(74) *Attorney, Agent, or Firm* — Sughrue Mion, PLLC

(57) ABSTRACT

A multi-view image display apparatus is provided. The apparatus includes a crosstalk compensator configured to compensate for crosstalk with respect to multi-view images by using a crosstalk matrix defining the crosstalk that occurs between the multi-view images; a tracker configured to track a position of a user's face as a user's position is moved; a controller configured to determine at least two views to be provided as images for user's left and right eyes from among the multi-view images based on the tracked position of the user's face, and to control the crosstalk compensator to compensate for the crosstalk by applying a predetermined weight to the at least two determined views; and a display configured to display the multi-view images of which the crosstalk is compensated.

14 Claims, 18 Drawing Sheets

(52) U.S. Cl.
CPC ..... *H04N 13/0447* (2013.01); *H04N 13/0475* (2013.01); *H04N 13/0477* (2013.01); *H04N 13/0404* (2013.01); *H04N 13/0409* (2013.01)

(56) References Cited

U.S. PATENT DOCUMENTS

| | | | |
|---|---|---|---|
| 2010/0060667 A1* | 3/2010 | Chen | G09G 5/10 345/690 |
| 2010/0134493 A1* | 6/2010 | Kwak | G09G 3/003 345/426 |
| 2012/0113101 A1 | 5/2012 | Yamamoto et al. | |
| 2013/0021333 A1* | 1/2013 | Tsuchida | H04N 13/0282 345/419 |
| 2013/0063575 A1* | 3/2013 | Jia | H04N 13/0425 348/51 |
| 2014/0118824 A1 | 5/2014 | Hsieh et al. | |

FOREIGN PATENT DOCUMENTS

| | | |
|---|---|---|
| EP | 2 194 727 A1 | 6/2010 |
| JP | 2012-105101 A | 5/2012 |
| KR | 10-2010-0063300 A | 6/2010 |
| KR | 10-2013-0043836 A | 5/2013 |
| TW | 200950501 A1 | 12/2009 |
| WO | 2009095862 A1 | 8/2009 |
| WO | 2011063993 A1 | 6/2011 |

\* cited by examiner

FIG. 4A

|       | View1 | View2 | View3 | View4 |
|-------|-------|-------|-------|-------|
| View1 | 1     | a%    | b%    | a%    |
| View2 | a%    | 1     | a%    | b%    |
| View3 | b%    | a%    | 1     | a%    |
| View4 | a%    | b%    | a%    | 1     |

|    | v0 | v1 | v2 | v3 | v4 | v5 | v6 |
|----|----|----|----|----|----|----|----|
| v0 | 0  |    |    |    |    |    |    |
| v1 |    | 0  |    |    |    |    |    |
| v2 |    |    | 1  |    |    |    |    |
| v3 |    |    |    | 1  |    |    |    |
| v4 |    |    |    |    | 0  |    |    |
| v5 |    |    |    |    |    | 0  |    |
| v6 |    |    |    |    |    |    | 0  |

| 0 | 1 | 2 | 3 | 4 | 5 | 6 |

|    | v0 | v1  | v2 | v3 | v4  | v5 | v6 |
|----|----|-----|----|----|-----|----|----|
| v0 | 0  |     |    |    |     |    |    |
| v1 |    | 0.2 |    |    |     |    |    |
| v2 |    |     | 1  |    |     |    |    |
| v3 |    |     |    | 1  |     |    |    |
| v4 |    |     |    |    | 0.2 |    |    |
| v5 |    |     |    |    |     | 0  |    |
| v6 |    |     |    |    |     |    | 0  |

| 0 | 1 | 2 | 3 | 4 | 5 | 6 |

|    | v0 | v1  | v2  | v3  | v4  | v5 | v6 |
|----|----|-----|-----|-----|-----|----|----|
| v0 | 0  |     |     |     |     |    |    |
| v1 |    | 0.1 |     |     |     |    |    |
| v2 |    |     | 0.8 |     |     |    |    |
| v3 |    |     |     | 0.8 |     |    |    |
| v4 |    |     |     |     | 0.5 |    |    |
| v5 |    |     |     |     |     | 0  |    |
| v6 |    |     |     |     |     |    | 0  |

FIG. 6D

|    | v0 | v1 | v2 | v3 | v4 | v5 | v6 |
|----|----|----|----|----|----|----|----|
| v0 | 0  |    |    |    |    |    |    |
| v1 |    | 1  |    |    |    |    |    |
| v2 |    |    | 1  |    |    |    |    |
| v3 |    |    |    | 1  |    |    |    |
| v4 |    |    |    |    | 0  |    |    |
| v5 |    |    |    |    |    | 0  |    |
| v6 |    |    |    |    |    |    | 0  |

|    | v0 | v1 | v2 | v3 | v4 | v5 | v6 |
|----|----|----|----|----|----|----|----|
| v0 | 0  |    |    |    |    |    |    |
| v1 |    | 1  |    |    |    |    |    |
| v2 |    |    | 1  |    |    |    |    |
| v3 |    |    |    | 0  |    |    |    |
| v4 |    |    |    |    | 1  |    |    |
| v5 |    |    |    |    |    | 1  |    |
| v6 |    |    |    |    |    |    | 0  |

MULTI-VIEW IMAGE DISPLAY APPARATUS AND CONTROL METHOD THEREOF

CROSS-REFERENCE TO RELATED APPLICATIONS

This application claims priority from Korean Patent Application No. 2013-0115326 filed Sep. 27, 2013 in the Korean Intellectual Property Office, the disclosure of which is incorporated herein by reference, in its entirety.

BACKGROUND

1. Technical Field

The exemplary embodiments relate to a multi-view image display apparatus and a control method thereof. More particularly, the exemplary embodiments relate to a glasses-free multi-view image display apparatus, and a control method thereof.

2. Description of the Related Art

Thanks to the development of electronic technology, various types of electronic devices are being developed and have become widespread. In particular, a display apparatus such as the TV, one of household appliances that have been the most widely used in typical homes, has rapidly developed in recent years.

As the performance of the display apparatus is advanced, the kinds of content that is displayed in the display apparatus have variously increased. In particular, in recent years, three-dimensional display systems that can display 3D content have been developed and are becoming widespread.

The three-dimensional display apparatus may be implemented as various types of display apparatuses, such as various types of monitors, cell phones, personal digital assistances (PDAs), personal computers, set-top PCs, tablet computers, electronic frames, kiosks, etc., as well as 3D TVs that are used in the typical homes. 3D display technology may be utilized in various fields that use or need 3D imaging, such as science, medicine, design, education, advertising, computer games, etc., as well as in the home.

A three-dimensional display system may be classified as a glasses-free system in which a three-dimensional display is viewable without glasses and a glasses system in which a pair of glasses should be worn to watch the 3D television.

The glasses system can provide a satisfactory three-dimensional experience, but there are inconveniences that result from a viewer wearing the glasses. In contrast, the glasses-free system has the advantage that the viewer can watch 3D images without glasses; and thus, the glasses free systems are constantly being developed.

However, in the glasses-free system, due to the difference in arrangement between pixel columns and lenticular lenses, there is a problem that light that is emitted from other pixels is overlapped so that crosstalk occurs between images. The crosstalk refers to a phenomenon in which a mixed image of a nth image and some of a n+1 image or a n−1 image as well as the nth image is visible to a user's left and right eyes. Because the same object is visible from different views, if the crosstalk occurs, several outlines of the object are visible and the object becomes blurred. Accordingly, there is a problem that, when the crosstalk increases, image quality is reduced.

SUMMARY

The exemplary embodiments have been developed in order to overcome the above drawbacks and other problems associated with the arrangements of the related art. An aspect of the exemplary embodiments is to provide a multi-view image display apparatus that can minimize crosstalk and provide a three-dimensional experience, and a control method thereof.

The above aspects and/or other features of the exemplary embodiments can be substantially achieved by providing a multi-view image display apparatus, which may include a crosstalk compensator configured to compensate for crosstalk with respect to multi-view images by using a crosstalk matrix which defines the crosstalk that occurs between the multi-view images; a tracker configured to track a position of a user's face as a user's position is moved; a controller configured to determine at least two views to be provided as images for user's left and right eyes from among the multi-view images based on the tracked position of the user's face, and to control the crosstalk compensator to compensate for the crosstalk by applying a predetermined weight to the at least two determined views; and a display configured to display the multi-view images having compensated crosstalk.

The crosstalk compensator may determine the at least two views to be provided as the images for the user's left and right eyes based on the tracked position of the user's face and a viewing distance, and may control the crosstalk compensator to compensate for the crosstalk by applying a predetermined weight to the at least two determined views.

The crosstalk compensator may compensate for the crosstalk that occurs between the multi-view images by multiplying an inverse matrix of the crosstalk matrix to a pixel matrix consisting of pixel values of the multi-view images.

The controller may control the crosstalk compensator to compensate for the crosstalk by applying a weight matrix that is configured to apply a weight higher than a weight to be applied to remaining views, to the at least two views to the inverse matrix of the crosstalk matrix.

The controller may control the crosstalk compensator to compensate for the crosstalk by applying a weight matrix that is configured to apply a predetermined weight to a different number of views, depending on the viewing distance to the inverse matrix of the crosstalk matrix.

The controller may control the crosstalk compensator to compensate for the crosstalk by applying a weight matrix that is configured to apply a predetermined weight to at least four views that will be provided as images for left and right eyes of each of the plurality of users to the inverse matrix of the crosstalk matrix in response to there being a plurality of users.

The crosstalk matrix may include a matrix that is predefined by considering characteristics of the display.

According to another aspect of the exemplary embodiments, a method of controlling a multi-view image display apparatus may include tracking a position of a user's face as a user's position is moved; determining at least two views that will be provided as images for left and right eyes of the user from among multi-views based on the tracked position of the user's face; compensating for crosstalk by applying a predetermined weight to the at least two determined views by using a crosstalk matrix defining the crosstalk that occurs between multi-view images; and displaying the multi-view images which are compensated for crosstalk.

The compensating for the crosstalk may include determining the at least two views that will be provided as the images for the left and right eyes of the user based on the tracked position of the user's face and a viewing distance, and compensating for the crosstalk by applying the predetermined weight to the at least two determined views.

The compensating for the crosstalk may include compensating for the crosstalk that occurs between the multi-view images by multiplying an inverse matrix of the crosstalk matrix to a pixel matrix consisting of pixel values of the multi-view images.

The compensating for the crosstalk may include compensating for the crosstalk by applying a weight matrix that is configured to apply a weight higher than a weight to be applied to remaining views to the at least two views to the inverse matrix of the crosstalk matrix.

The compensating for the crosstalk may include compensating for the crosstalk by applying a weight matrix that is configured to apply a predetermined weight to a different number of views, depending on the viewing distance to the inverse matrix of the crosstalk matrix.

The compensating for the crosstalk may include compensating for the crosstalk by applying a weight matrix that is configured to apply a predetermined weight to at least four views that will be provided as images for left and right eyes of each of the plurality of users to the inverse matrix of the crosstalk matrix, in response to there being a plurality of users.

The crosstalk matrix may include a matrix that is predefined by considering characteristics of a display on which the multi-view images are displayed.

According to exemplary embodiments, a glasses-free 3D system that can minimize crosstalk may be provided.

An aspect of an exemplary embodiment may provide a multi-view image display apparatus including: a crosstalk compensator configured to compensate for crosstalk with respect to multi-view images by using a crosstalk matrix which defines the crosstalk that occurs between the multi-view images; a tracker configured to track a position of a user's face as a user's position is moved; and a controller configured to determine at least two views to be provided as images for a user's left and right eyes from among the multi-view images, and to control the crosstalk compensator to compensate for the crosstalk.

The controller may determine at least two views to be provided as images for a user's left and right eyes from among the multi-view images, based on the tracked position of the user's face.

The controller may control the crosstalk compensator to compensate for the crosstalk by applying a predetermined weight to the at least two determined views.

The multi-view image display apparatus may further include display configured to display the multi-view images, the crosstalk of which is compensated for.

The crosstalk compensator may compensate for the crosstalk that occurs between the multi-view images by multiplying an inverse matrix of the crosstalk matrix to a pixel matrix comprising pixel values of the multi-view images.

In addition, the controller may be configured to control the crosstalk compensator to compensate for crosstalk by applying a weight matrix that is configured to apply a higher weight to the at least two views of the inverse matrix of the crosstalk matrix than a weight to be applied to remaining views.

Other objects, advantages and salient features of the exemplary embodiments will become apparent from the following detailed description, which, taken in conjunction with the annexed drawings, discloses exemplary embodiments.

BRIEF DESCRIPTION OF THE DRAWINGS

These and/or other aspects and advantages will become apparent and more readily appreciated from the following description of the exemplary embodiments, taken in conjunction with the accompanying drawings of which:

FIGS. 4A and 4B are views which illustrate a configuration of a crosstalk matrix according to an exemplary embodiment;

FIGS. 6A to 6E are views for explaining types of a weight matrix according to exemplary embodiments;

Throughout the drawings, like reference numerals will be understood to refer to like parts, components and structures.

DETAILED DESCRIPTION OF THE EXEMPLARY EMBODIMENTS

Hereinafter, certain exemplary embodiments will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of the exemplary embodiments.

Figure 1:
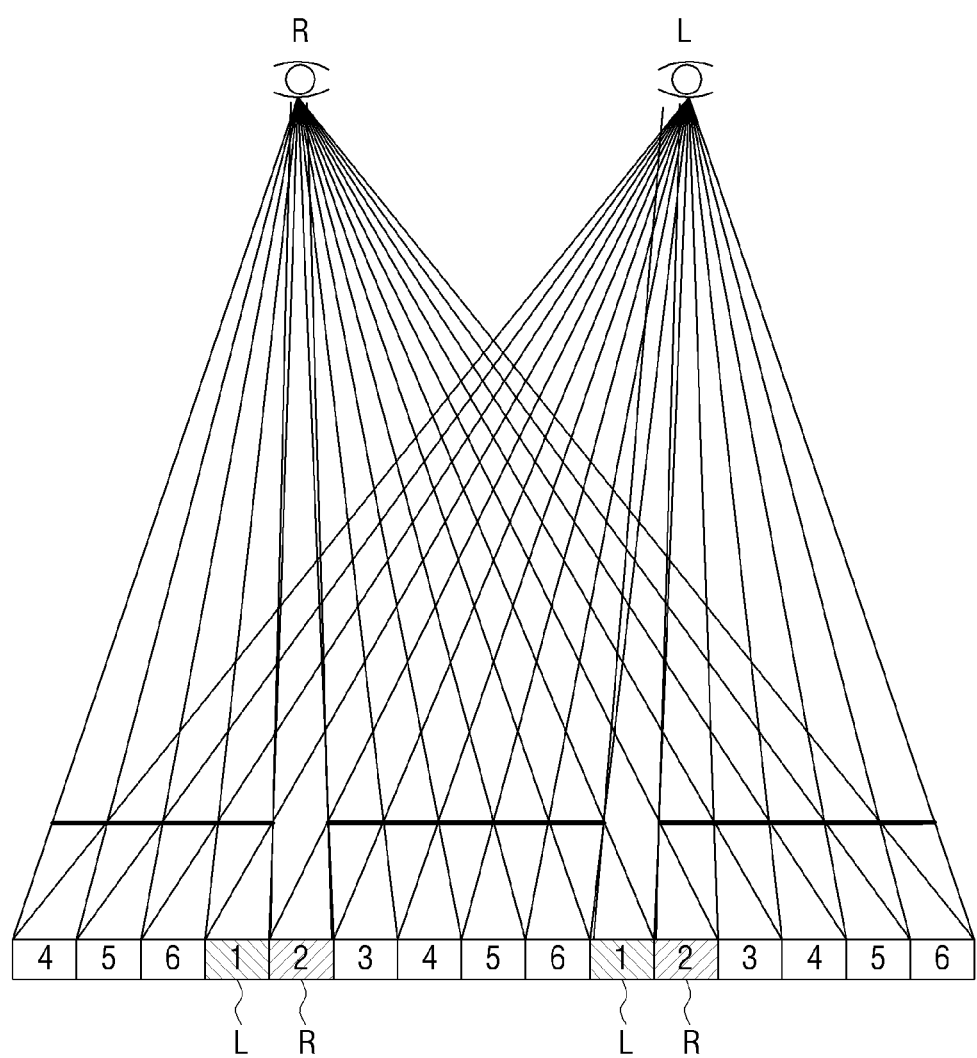
FIG. 1 is a view for explaining operation of a glasses-free 3D display apparatus in order to help with an understanding of the exemplary embodiments.

FIG. 1 is a view for explaining operation of a glasses-free 3D display apparatus in order to help with an understanding of the exemplary embodiments.

FIG. 1 shows an operation way of an apparatus that provides three-dimensional images in a glasses-free manner by displaying multi-view images according to an embodiment of the present disclosure. Here, the multi-view images include a plurality of images of the same object taken at different angles. The plurality of images taken at different viewpoints is refracted by angles different from each other, and then focused images are provided to a position that is spaced a certain distance (e.g., about 3 m) that is the so-called viewing distance. The position where these images are formed is referred to as a viewing area. If one eye of a user is placed at a first viewing area and the other eye of the user is placed at a second viewing area, the user can feel a three-dimensional impression.

For example, FIG. 1 is a view for explaining a display operation of a multi-view image having a total of 6 viewpoints. According to FIG. 1, the glasses-free 3D display apparatus allows light corresponding to a first viewpoint image among six viewpoint images to be projected to the left eye and allows light corresponding to a second viewpoint image to be projected to the right eye. Accordingly, since the left eye and right eye of the user watches images of viewpoints different from each other, the user is able to feel the three-dimensional impression.

Figure 2:
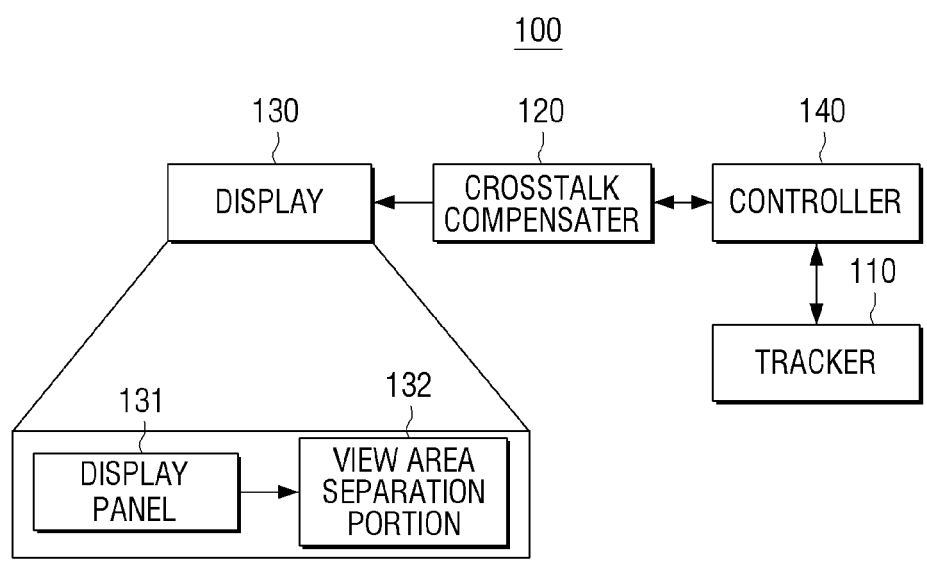
FIG. 2 is a block diagram which illustrates a configuration of a display apparatus according to an exemplary embodiment.

FIG. 2 is a block diagram illustrating a configuration of a display apparatus according to an embodiment of the present disclosure.

The display apparatus 100 as illustrated in FIG. 2 may be implemented as various types of display apparatuses such as a TV, a monitor, a cell phone, a personal digital assistance (PDA), a personal computer (PC), a set top PC, a kiosk, a tablet computer, an electronic frame, etc.

According to FIG. 2, the display apparatus 100 includes a tracker 110, a crosstalk compensator 120, a display 130 and a controller 140.

The tracker 110 tracks the position of the user; specifically the position of the user's face, and then provides corresponding information to controller 140.

Also, the tracker 110 tracks a distance between the display 130 and the position of the user's face, namely, a viewing distance, and then provides corresponding information to the controller 140.

For this purpose, the tracker 110 may include a photographing unit (not illustrated) and a detection unit (not illustrated).

The photographing unit (not illustrated) is disposed in the outer region of the display apparatus 100. For example, the photographing unit (not illustrated) may be disposed in the center area of the top bezel, the center area of the left side bezel, or the center of the right side bezel of the display apparatus 100. However, the installation position of the photographing unit (not illustrated) is not limited to this description.

The photographing unit (not illustrated) photographs the user. The photographing unit (not illustrated) includes a lens module having lenses and an image sensor. A shape inputted through the lens is inputted to the image sensor that serves as a film as an optical signal and the image sensor converts the inputted optical signal into an electrical signal and then transmits the electrical signal to the detection unit (not illustrated). For example, the photographing unit (not illustrated) may be implemented as a stereo camera, a depth camera, etc. that can detect the user's viewing distance.

The detection unit (not illustrated) detects the position of the user's face from the user photographing image received from the photographing unit (not illustrated), and then tracks the position of the user face. In particular, the detection unit (not illustrated) tracks a moving position of the user based on the positions of the user's face area that are detected from the previous frame and the current frame, and provides the corresponding information to the controller 140.

Various methods of the related art may be used as the method of detecting a face area. In particular, a direct recognition method and a method using statistics may be used. The direct recognition method creates a rule by using physical features, such as a contour, a skin color, sizes of components, distances between the components, etc. of the face image on the screen, and then performs comparison, inspection and measurement, based on the rule. The method using the statistics can detect the face area according to a pre-learned algorithm.

In other words, the method using the statistics is a method that analyzes the face by creating data of inherent characteristics of the input face, and then by comparing the data with large amounts of data in a prepared database (shapes of the faces and other objects). In particular, the face area may be detected according to a pre-learned algorithm, and a method such as the multi-layer perceptron (MLP) and the support vector machine (SVM) may be used. A detail description thereof will be omitted.

Also, the user's viewing distance may be detected from the photographed user image received from the photographing unit (not illustrated), and then may be provided to the controller 140. In particular, in response to the photographing unit (not illustrated) being implemented by a depth camera, the viewing distance may be automatically detected from an image photographed by the camera. However, the detection of the viewing distance is not limited to this description. The viewing distance may be implemented to be directly set by user. For example, the user can set the viewing distance by using an on screen display menu (OSD menu) that is provided in the display apparatus 100, buttons that are provided by viewing distances in a remote controller, etc.

The crosstalk compensator 120 compensates for crosstalk based on a crosstalk matrix defining crosstalk that occurs between the multi-view images. The multi-view images may be generated based on the stereo-images and the depth map, or images that are captured in an angle which corresponds to each view. The method of generating the multi-view images is technology of the related art; a detailed description thereof will therefore be omitted.

In particular, the crosstalk compensator 120 may compensate for the crosstalk by using the inverse matrix of the pre-defined crosstalk matrix. Hereinafter, a method to calculate the inverse matrix of the crosstalk matrix will be briefly described.

For example, in response to a 3D display apparatus that provides 3D images by using multiple-views, brightness of an input signal of each view is defined as $I_1, I_2, \ldots, I_n, \ldots, I_N$, and output brightness that is actually measured due to the crosstalk between the views is defined as $I'_1, I'_2, \ldots, I'_n, \ldots, I'_N$, for example, the output brightness $I'_n$ of an nth image may be expressed as the combination using weight of input images like Formula 1.

$$I'_n = a_1 I_1 + a_2 I_2 + \ldots + a_n I_n + \ldots + a_N I_N \qquad \text{<Formula 1>}$$

wherein $a_1$ to $a_N$ refers to the degree of impact which each of the input images gives to the output brightness $I'_n$. For example, in response to $a_n$ being 0.7, only 70% of the nth image is output as the nth view, and the remaining 30% of the nth image refers to light that is leaked and inputted from the different views.

At this time, the sum of $a_1$ to $a_N$ becomes one (1).

In this way, the relationship between the input brightness and the output brightness of the display in all the views may be expressed by using the crosstalk matrix X, like in Formula 2.

$$A' = X \cdot A \rightarrow A = X^{-1} \cdot A \qquad \text{<Formula 2>}$$

wherein X is a matrix that represents the brightness of the multi-views that will be output, A' is a matrix that represents the brightness of the multi-views that are actually output through the display, X is a crosstalk matrix that represents the degree of the impact which each of the multi-views extends to the views different from each other contained in the multi-views when being output through the display, and $X^{-1}$ is an inverse matrix of the crosstalk matrix.

In response to the relationship expressed as Formula 2 being used, how to adjust input values in order to obtain a desired output brightness in all the views by using the inverse matrix of the crosstalk matrix X can be calculated.

In other words, the output of the display may be corrected by providing the multi-view signals that are compensated for by multiplying the inverse matrix of the crosstalk matrix to the input signal that is required to output the brightness of $I_1$, $I_2, \ldots, I_n, \ldots, I_N$ to the display. In particular, the multi-view signals may be compensated for by multiplying the inverse matrix of the crosstalk matrix to a pixel matrix that is configured of pixel values of the multi-view images.

Alternatively, the crosstalk compensator 120 may compensate for the crosstalk by using the crosstalk matrix divided by each color. In other words, the crosstalk compensator 120 can compensate for the crosstalk pixel-by-pixel by using a discrete crosstalk matrix that is predefined with respect to each of R, G, and B pixels.

On the other hand, the crosstalk compensator 120 may convert the multi-view image signal into a signal that is linear to the brightness for performing the crosstalk compensation operation for the multi-view image. For example, in response to the multi-view image signal being a RGB signal represented by RGB, the multi-view image signal may be converted into a linear RGB signal having a linear relationship with the brightness, and then the crosstalk compensation may be performed.

The display 130 performs a function to provide multi-views (or multi-optical views). For this, the display 130 includes a display panel 131 and a view area separation portion 132 for providing the multi-views.

The display panel 131 includes a plurality of pixels that are configured of a plurality of sub pixels. Each sub pixel may be configured of red (R), green (G) and blue (B) sub pixels. In other words, pixels configured of the sub pixels of R, G, and B are arranged in a plurality of row and column directions so as to constitute the display panel 131. In this case, the display panel 131 may be implemented as various types of display units such as a liquid crystal display panel (LCD panel), a plasma display panel (PDP), an organic light emitting diode (OLED), a vacuum fluorescent display (VFD), a field emission display (FED), an electro luminescence display (ELD), etc.

The display panel 131 displays image frames. In particular, the display panel 131 may display the image frames in which a plurality of images having different viewpoints from each other are disposed sequentially and repeatedly.

On the other hand, even though not illustrated in FIG. 2, in response to the display panel 131 being implemented as a LCD panel, the display apparatus 100 may be equipped with a backlight unit (not illustrated) to provide backlight to the display panel 131, and a panel driving unit (not illustrated) to drive the pixels of the display panel 131 according to a pixel value of each of the pixels constituting the image frame.

Accordingly, in response to light generated in the backlight unit (not illustrated) being incident on each pixel of the display panel 131, the display panel 131 displays the image frame by adjusting the transmittance for light that is incident on each pixel according to the image signal. In particular, the display panel 131 includes a liquid crystal layer and two electrodes that are formed on opposite surfaces of the liquid crystal layer. In response to a voltage being applied to the two electrodes, an electric field is generated to move molecules of the liquid crystal layer between the two electrodes, thereby adjusting the transmittance of the light.

The view area separation portion 132 is disposed in a front surface of the display panel 131, and may provide different viewpoints by viewing areas, namely, multi-views. In this case, the view area separation portion 132 may be implemented as a lenticular lens, or as a parallax barrier.

For example, the view area separation portion 132 may be implemented as the lenticular lens which includes a plurality of lens areas. Accordingly, the lenticular lens can refract the image that is being displayed on the display panel 131 through the plurality of lens areas. Each lens area is formed in the size which corresponds to at least one pixel, and may allow the light passing through each pixel to be dispersed differently by viewing areas.

As another example, the view area separation portion 132 may be implemented as a parallax barrier. The parallax barrier is implemented as a transparent slit array including a plurality of barrier areas. Accordingly, the parallax barrier may allow an image that has a different viewpoint, by viewing areas, to be emitted by blocking the light through slits between the barrier areas.

On the other hand, the view area separation portion 132 may operate in a state when it is tilted at a certain angle, in order to improve the quality of the image. The controller 140 divides the image frames of each of images that are photographed at a plurality of viewpoints based on the angle at which the view area separation portion 132 is tilted, and may then generate image frames by combining them. Accordingly, the user watches not images that are displayed in a vertical direction or a horizontal direction on the sub pixels of the display panel 131, but rather views images that are displayed to have a certain gradient on the sub pixels.

Figure 3:
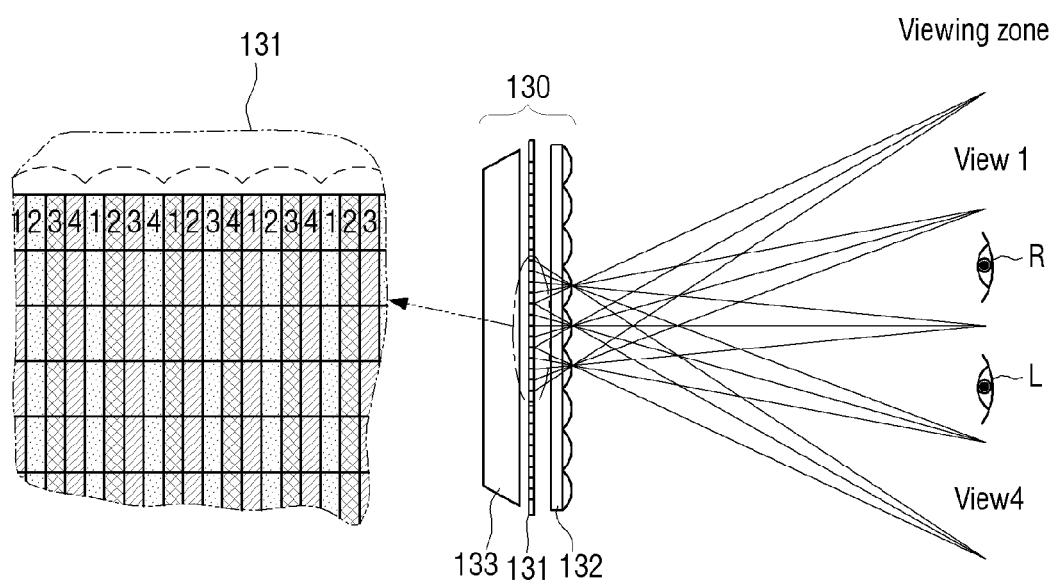
FIG. 3 is a view for explaining an example of a display to be implemented according to an exemplary embodiment.

FIG. 3 is a view for explaining an example of a display to be implemented according to an exemplary embodiment.

According to FIG. 3, the display 130 includes the display panel 131, the view area separation portion 132, and the backlight 133.

In FIG. 3, the view area separation portion 132 is implemented as a lenticular lens array.

According to FIG. 3, the display panel 131 includes a plurality of pixels that is divided by a plurality of columns. Images having different viewpoints are disposed in each column. According to FIG. 3, a plurality of images 1, 2, 3 and 4 having different viewpoints is arranged sequentially and repeatedly. In other words, each of the pixel columns is arranged in a group that is numbered as 1, 2, 3 and 4. A graphic signal that is applied to the panel is arranged so that the pixel column 1 displays the first image, and the pixel column 2 displays the second image.

The backlight 133 provides light to the display panel 131. The images 1, 2, 3, and 4 that are formed in the display panel 131 are projected to the view area separation portion 132 by the light being provided by the backlight 133, and the view area separation portion 132 disperses and transmits the light of each of the projected images 1, 2, 3 and 4 toward the user. In other words, the view area separation portion 132 generates exit pupils at the viewer's position, namely, at the viewing distance. The thickness and diameter of the lenticular lens, when the view area separation portion 132 is implemented as the lenticular lens as illustrated in FIG. 3, and the interval of the slits, when the view area separation portion 132 is implemented as the parallax barrier, may be designed so that the exit pupils generated by each column are separated by the average center distance of both eyes of less than 65 mm. Each of the separated image lights forms a viewing area. In other words, as illustrated in FIG. 3, the first to the fourth views are formed, and in response to the left eye and right eye of the user being placed at the second view and the third view, the user can watch 3D images.

The controller 140 controls overall operations of the display apparatus 100.

In particular, the controller 140 may perform control function to display the image frames by rendering the image frames based on the distance between the display panel 131 and the view area separation portion 132 so that different views are spaced apart at regular intervals. In this case, each view may be generated by using a plurality of virtual viewpoint images, which is not related to the technical features of the exemplary embodiments, so a detailed description thereof will be omitted.

The controller 140 determines at least two views that will be provided as images for the left and right eyes of the user from among the multi-views based on the user's face position that is tracked by the tracker 110, and may control the crosstalk compensator 120 to compensate for the crosstalk by applying a preset weight to the at least two determined views.

In particular, the controller 140 may control the crosstalk compensator 120 to generate a weight matrix configured to apply a weight higher than a weight to be applied to the remaining views to the at least two views being provided as the images for the left and right eyes of the user among the multi-views, and to compensate for the crosstalk by applying the weight matrix and the inverse matrix of the crosstalk matrix to the multi-view images. The weight matrix may become in the form of a diagonal matrix, and this will be described later with reference to the drawings.

Also, the controller 140 may control the crosstalk compensator 120 to compensate for the crosstalk by applying the inverse matrix of the crosstalk matrix and a weight matrix configured of different values depending on the distance between the display unit 130 and the user's face, namely, the viewing distance to the multi-view images.

Also, the controller 140 may control the crosstalk compensator 120 to compensate for the crosstalk by applying a weight matrix that is configured to apply a predetermined weight to a different number of views, depending on the viewing distance to the multi-view images.

Hereinafter, the crosstalk compensation method according to an exemplary embodiment will be described in more detail with reference to the drawings.

Figure 4B:
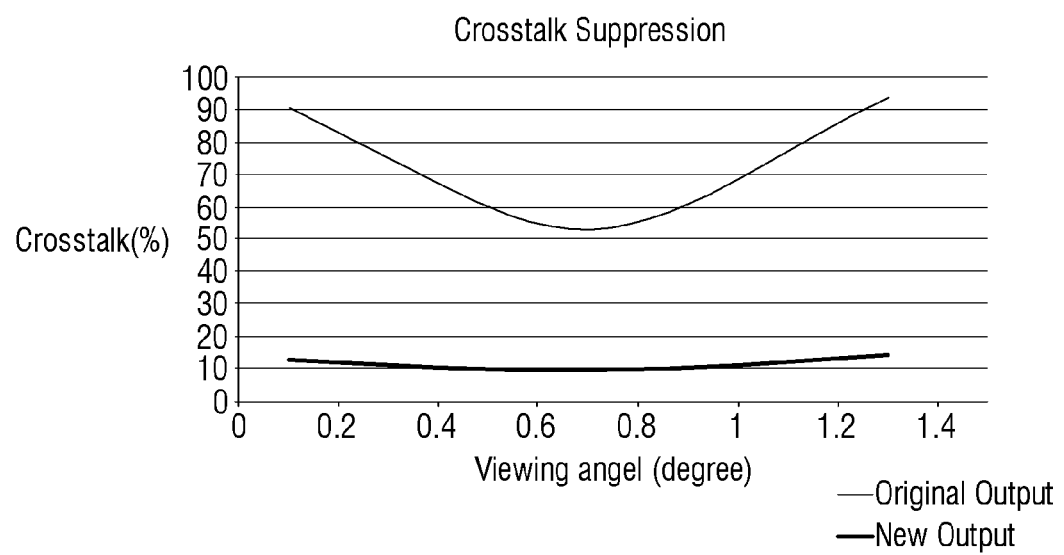

FIGS. 4A and 4B are views which illustrate a configuration of a crosstalk matrix according to an exemplary embodiment.

As illustrated in FIG. 4A, the crosstalk matrix according to an exemplary embodiment may be composed of values reflecting the optical characteristics of the multi-views.

For example, the crosstalk matrix, as illustrated in FIG. 4A, has four views. However, the number of rows and columns that constitute the matrix may be changed depending on the number of views.

For example, in the case of view 2 of FIG. 4A, a %, a %, and b % may be light (crosstalk) that is leaked and enters from view1, view3, and view4, respectively.

In other words, in response to the inverse matrix of the crosstalk matrix consisting of values that the effect of the other views about each view is numerically calculated is used, how to adjust the input values in order to obtain desired output brightness in all of the views may be calculated. This was described in detail based on Formulas 1 and 2. Therefore, further description thereof will be omitted.

On the other hand, such a crosstalk matrix may be pre-stored, and each numerical value of the pre-stored crosstalk matrix may be made of values that were previously measured through experiments. In this case, the crosstalk matrix may be configured to have different values by types of the display apparatus 100.

A plurality of crosstalk matrixes which correspond to the distance between the display 130 and the user may be stored. These also may be made up of values that were previously measured through experiments.

FIG. 4B is a view which illustrates the effect of crosstalk reduction in response to the crosstalk matrix, according to FIG. 4A, being applied.

In response to the brightness of each view being corrected by using the crosstalk matrix, in particular, the inverse matrix of the crosstalk matrix, as illustrated in FIG. 4B, the crosstalk occurring in all the views may be reduced as a whole.

Hereinafter, a method of reducing the crosstalk by putting different weights onto each of the multi-views, by tracking the user's face according to an exemplary embodiment, will be described.

FIGS. 5A to 5D are views for explaining a multi-view watching method in response to a user's face position, namely, a user's eye position, being moved to help with an understanding of the exemplary embodiments.

Figure 5A:
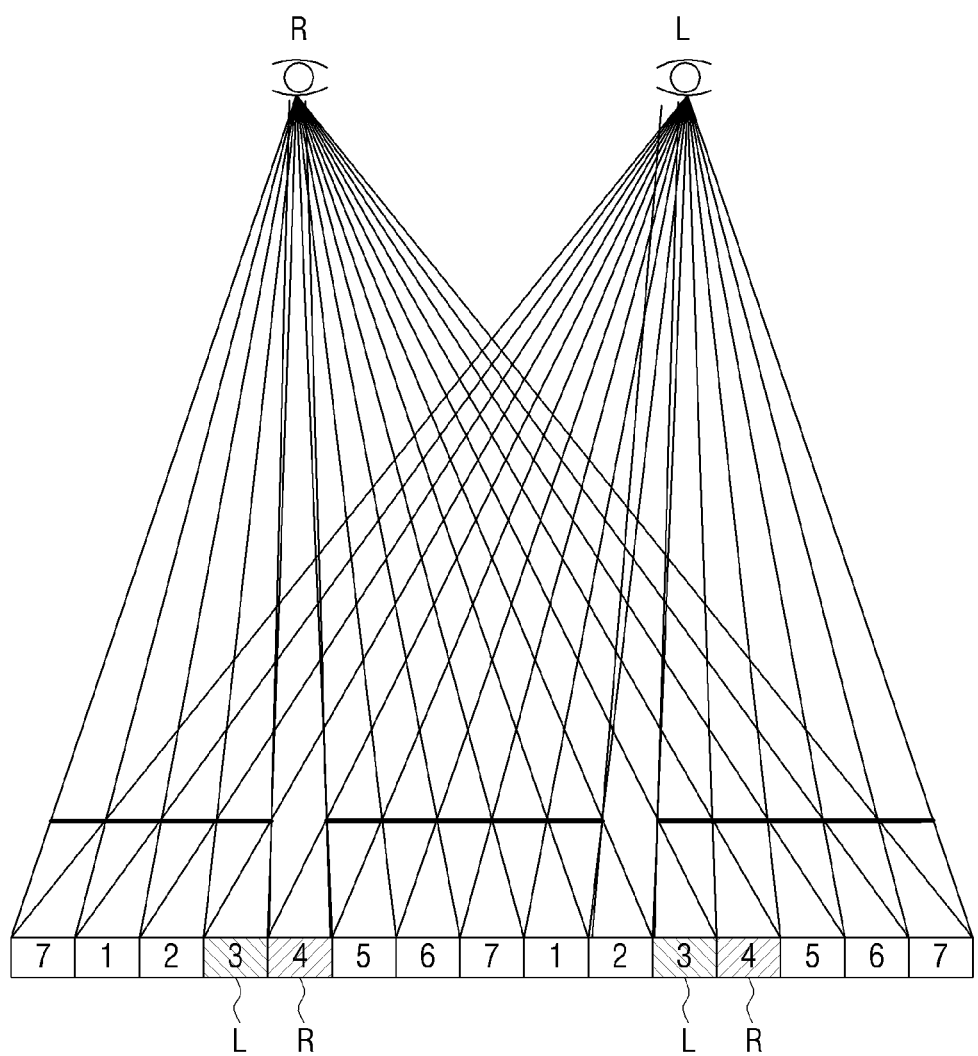
FIGS. 5A to 5D are views for explaining a multi-view watching method in response to a user's face position, namely, eye position, being moved, in order to help with an understanding of the exemplary embodiments.

As illustrated in FIG. 5A, a state in which the user's left eye and right eye recognize the third and fourth views of the first to seventh views and watch 3D images according to the parallax is assumed.

Figure 5B:
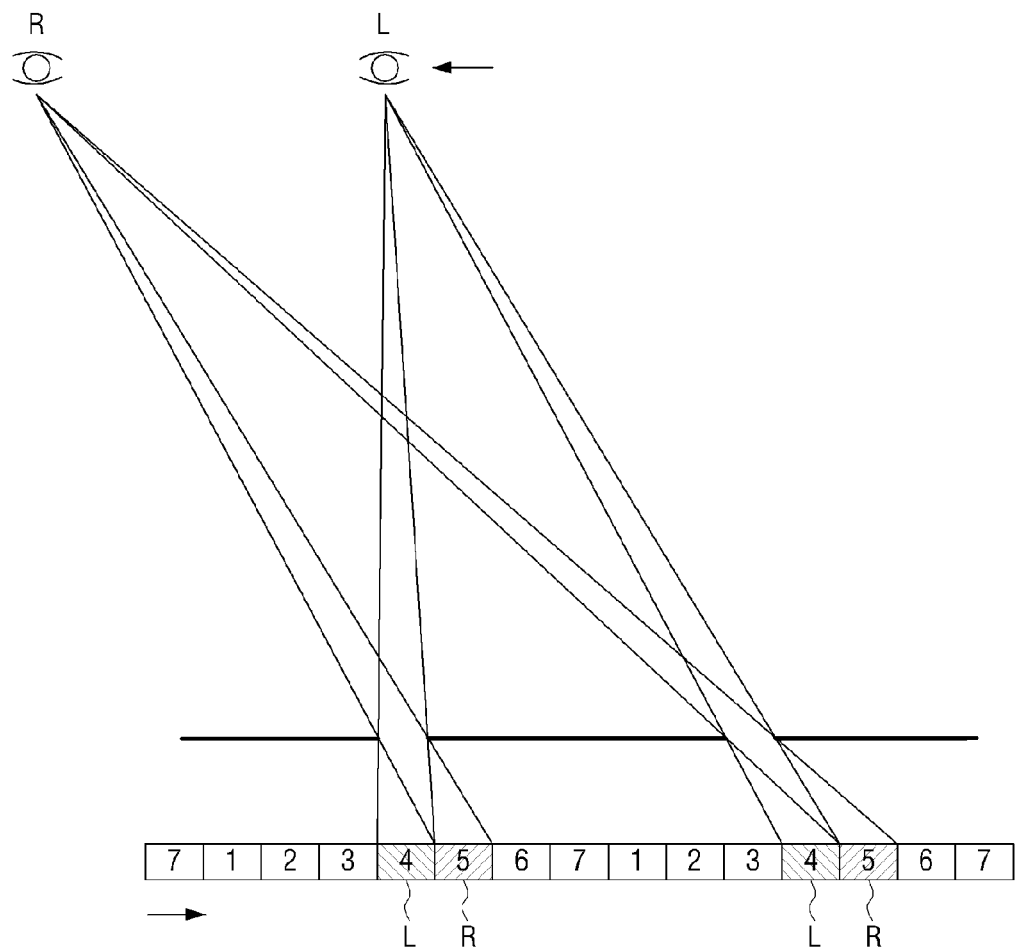

Then, as illustrated in FIG. 5B, in response to the position of the user being moved to the left, the user's left eye and right eye recognize the fourth view and fifth view.

Figure 5C:
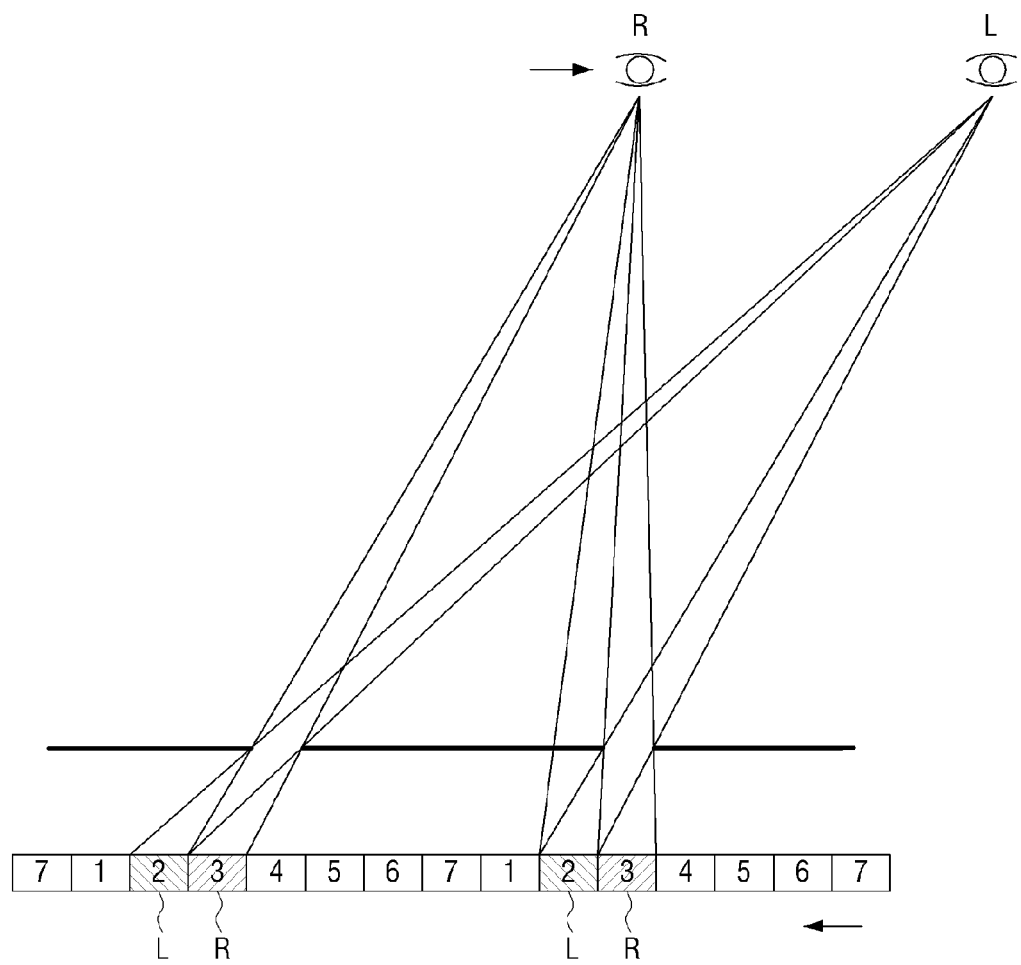

Also, as illustrated in FIG. 5C, in response to the position of the user being moved to the right, the user's left eye and right eye recognize the second view and third view.

Figure 5D:
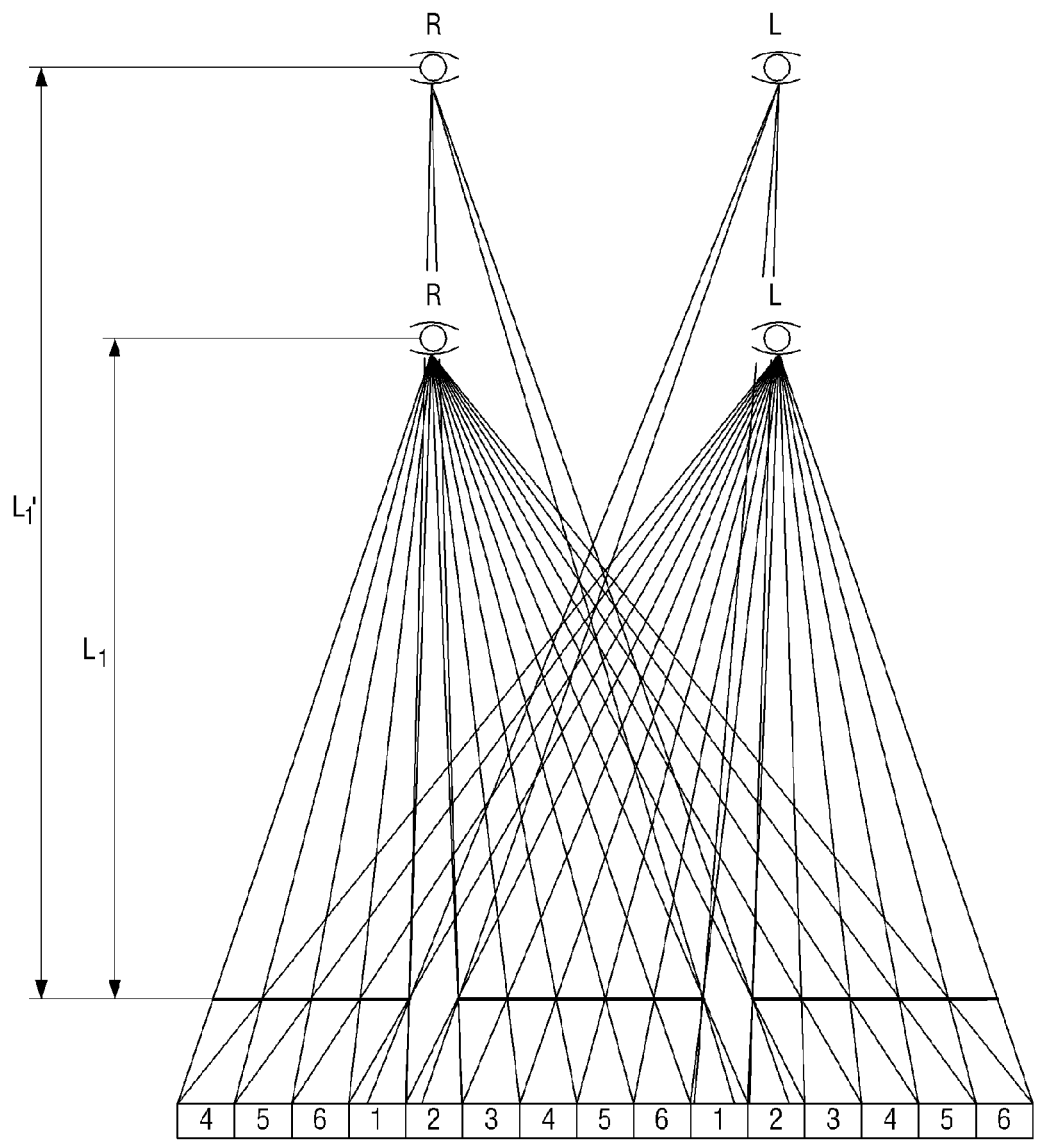

On the other hand, as illustrated in FIG. 5D, in response to the viewing distance of the user is changed, the views recognized by the user's left and right eyes may be changed. In a case that multi-views having a total of 6 viewpoints are provided as illustrated in FIG. 5D, in response to the viewing distance being L1, light corresponding to the first view is emitted to the left eye and light corresponding to the second view is emitted to the right eye. However, in response to the viewing distance being changed to L1', the second view image as well as the first view image may be projected to the viewer's left eye. Also, the first view image as well as the second view image may be projected to the viewer's right eye.

Accordingly, in the exemplary embodiments, when compensating for the crosstalk by tracking the user's eye position, the crosstalk is compensated for by giving weight to the view that is recognized by the user from among the multi-views. For this purpose, an exemplary embodiment may use a weight matrix. Therefore, various types of weight matrixes will be hereinafter described.

FIGS. 6A to 6E are views for explaining types of weight matrixes according to various exemplary embodiments.

For convenience of description, in FIGS. 6A to 6E, an assumption is made that the number of multi-views is six.

Figure 6A:
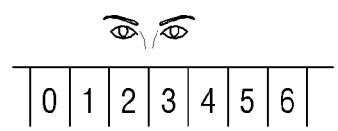

As illustrated in FIG. 6A, the weight matrix may be configured so that the weight is applied only to the views that are inputted to the left and right eyes of the user.

For example, in response to the weight matrix as illustrated in FIG. 6A being used, the crosstalk compensation may be performed for the second and third views that are inputted to the left and right eyes of the user, and crosstalk compensation may not be performed for the remaining views.

Figure 6B:
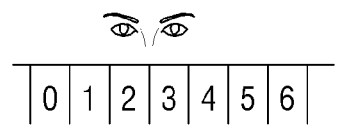

Alternatively, as illustrated in FIG. 6B, the weight matrix may be configured so that the weight is applied to the views that are inputted to the left and right eyes of the user and their adjacent views.

For example, in response to the weight matrix as illustrated in FIG. 6B being used, crosstalk compensation may be performed for the first and fourth views adjacent to the second and third views as well as for the second and third views that are inputted to the left and right eyes of the user. However, in this case, crosstalk compensation may be performed mainly for the second and third views by applying a weight larger than a weight to be given to the first and fourth views to the second and third views. In an example as illustrated in FIG. 6B, a weight of one (1) is given to the second and third views, and a weight of 0.2 is given to the first and fourth views. However, the weight is not limited by these.

Figure 6C:
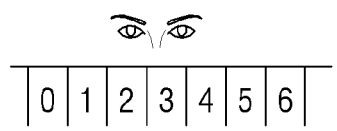

Alternatively, as illustrated in FIG. 6C, the weight matrix may be configured so that different weights are given to the adjacent views depending on the position of the left and right eyes of the user.

For example, when the left and right eyes of the user are biased to the third view side from the second and third views position (when the left and right eyes of the user are assumed to be at about 2.7 view position), the crosstalk may be compensated for by giving a weight larger than a weight to be given to the first view adjacent to the second view to the fourth view adjacent to the third view. In an example as illustrated in FIG. 6C, a weight of 0.8 is given to the second and third views, and weights of 0.1 and 0.5 are given to the first and fourth views, respectively. However, the weight is not limited to this description.

Alternatively, as illustrated in FIG. 6D, the weight matrix may be configured to compensate for the viewing distance. In other words, the number of views that are inputted to the left and right eyes of the user may vary depending on the viewing distance, so that this point may be compensated for.

For example, the same weight as that of the second and third views may be applied to the first view as well as the second and third views depending on the viewing distance. This may be provided based on a predefined resource representing influence of each of views according to the viewing distance as illustrated in FIG. 7C. In this case, the weight matrix may be used by real time updating of the predefined weight matrix depending on the position of the user's face or the predefined weight matrix may be used to compensate for the viewing distance, as well as the position of the user's face.

Figure 6E:
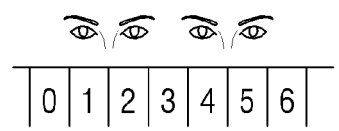

Alternatively, as illustrated in FIG. 6E, the weight matrix may be configured so that the crosstalk is compensated for by considering two or more viewers.

For example, when a view that is inputted to the left and right eyes of a first user is the first and second views, and the view that is inputted to the left and right eyes of a second user is the fourth and fifth views, the weight may be applied to the fourth and fifth views as well as the first and second views so that the crosstalk is compensated. In this case, the tracker 110 may be implemented in order to track positions of a plurality of user's faces.

Figure 7A:
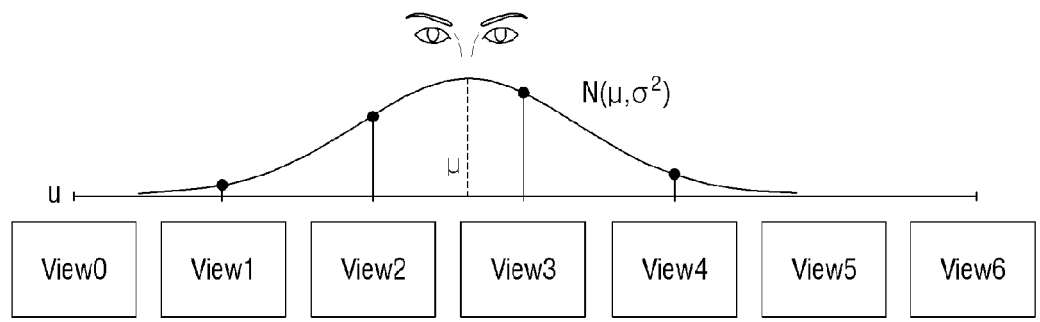
FIGS. 7A to 7C are views for explaining a method of calculating a weight matrix, according to an exemplary embodiment.
Figure 7B:
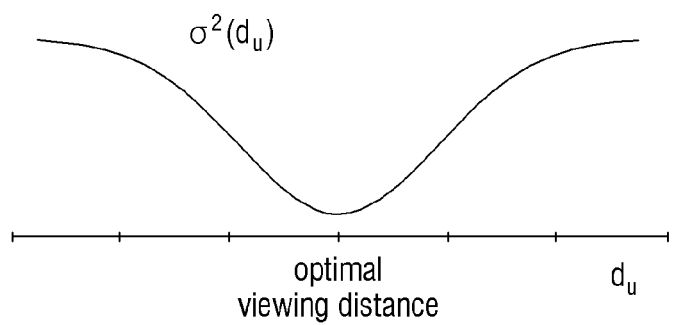
Figure 7C:
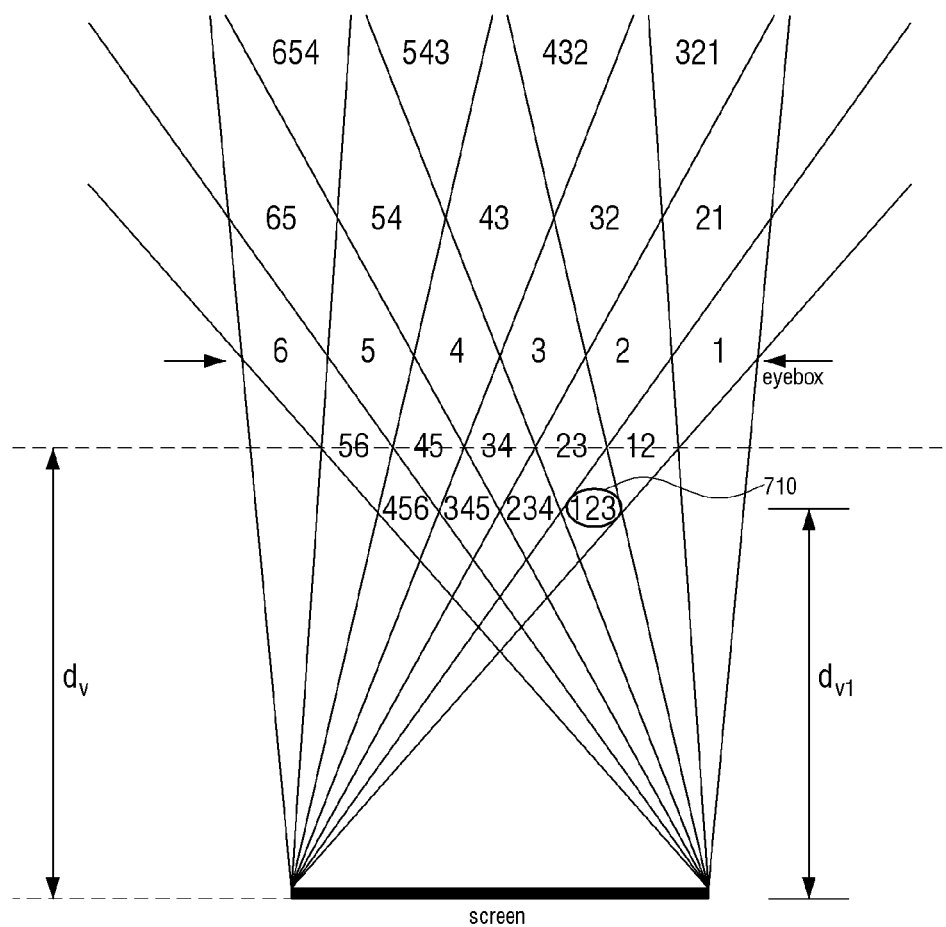

FIGS. 7A to 7C are views for explaining a method for calculating a weight matrix according to an exemplary embodiment.

Values of weights for implementing the weight matrix may be discretely sampled from a normalized distribution being centered around the tracked eye position. Formula 3 is an equation to calculate a weight value from a normalized distribution being centered around the tracked eye position.

$$w(v)=N(\mu,\sigma^2)(v) \qquad \text{<Formula 3>}$$

wherein $\mu$ is a tracked position of a user's eye, and $v$ represents a discrete viewpoint.

FIG. 7A is a graph to represent Formula 3, namely, a graph to represent values of $N(\mu, \sigma^2)$ depending on $\mu$.

On the other hand, the weight matrix may be implemented in the form of a diagonal matrix of the weight values that are calculated by Formula 3, like Formula 4.

$$W=\text{diag}(w) \qquad \text{<Formula 4>}$$

Alternatively, the weight values for implementing the weight matrix may be implemented to compensate for the viewing distance.

Formula 5 is an equation to calculate the weight values that are implemented to compensate for the viewing distance.

$$w(v)=N(\mu,\sigma^2(d_v))(v) \qquad \text{<Formula 5>}$$

Wherein $d_v$ numerically represents the viewing distance, and $\sigma^2(d_v)$ may have a shape that is illustrated in FIG. 7B.

FIG. 7C is a view which illustrates the influence between views according to the viewing distance $d_v$. As illustrated in FIG. 7C, because first to third views affect a region 710 of the viewing distance $d_{v1}$, the weight may be applied to the first to third views as illustrated in FIG. 6D.

On the other hand, when compensating for the crosstalk by using the weight matrix according to an exemplary embodiment, Formula 6 may be used.

$$p'_i=(X^TWX)^{-1}X^TWp_i \qquad \text{<Formula 6>}$$

Alternatively, when compensating for the crosstalk by using the weight matrix that reflects viewing distances according to another exemplary embodiment, Formula 7 may be used.

$$p'_i=(X^TW(d_v)X)^{-1}X^TW(d_v)p_i \qquad \text{<Formula 7>}$$

Wherein $W(d_v)$ means a weight matrix that reflects viewing distances as described above.

Figure 8:
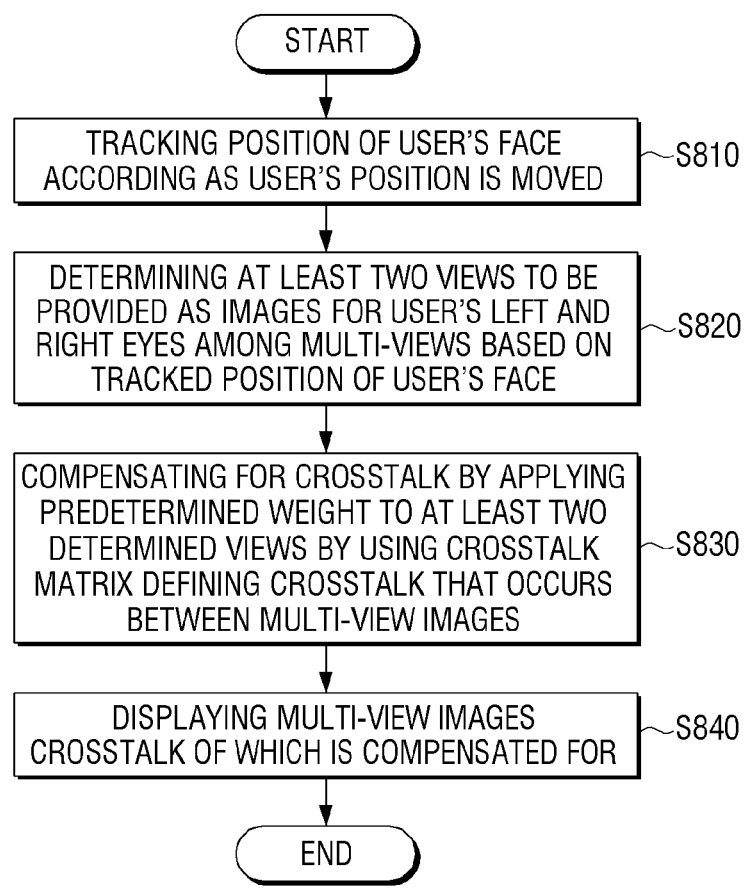
FIG. 8 is a flowchart for explaining a method of controlling a multi-view image display apparatus, according to an exemplary embodiment.

FIG. 8 is a flowchart for explaining a method of controlling a multi-view image display apparatus according to an exemplary embodiment.

According to a method of controlling a multi-view image display apparatus according to an exemplary embodiment, as illustrated in FIG. 8, first, a position of a user's face is being while the user's position is moved (S810).

Then, at least two views that will be provided as images for the user's left and right eyes from among the multi-views, and are determined based on the tracked position of the user's face (S820).

Then, the crosstalk is compensated for by applying a predetermined weight to the at least two determined views by using a crosstalk matrix defining the crosstalk that occurs between multi-view images (S830).

After that, the multi-view images in which the crosstalk is compensated for are displayed (S840).

On the other hand, in step S830, to compensate for the crosstalk may determine at least two views that will be provided as images for the user's left and right eyes based on the tracked position of the user's face and the viewing distance, and may compensate for the crosstalk by applying a predetermined weight to the at least two determined views.

Also, in step S830, the crosstalk may be compensated for between the multi-view images by multiplying the inverse matrix of the crosstalk matrix to a pixel matrix configured of pixel values of the multi-view images.

Also, in step S830, the crosstalk may be compensated for by applying a weight matrix that is configured to a weight higher than a weight to be applied to the remaining views, to at least two views of the inverse matrix of the crosstalk matrix.

Also, in step S830, the crosstalk may be compensated for by applying a weight matrix that is configured to apply a predetermined weight to a different number of views, depending on a viewing distance to the inverse matrix of the crosstalk matrix.

Also, in step S830, the crosstalk may be compensated for in response to there being a plurality of users, by applying a weight matrix that is configured to apply a predetermined weight to at least four views that will be provided as images for the left and right eyes of each of the plurality of users to the inverse matrix of the crosstalk matrix.

The crosstalk matrix may be a matrix that is predefined by considering the characteristics of the display on which the multi-view images are displayed.

According to the exemplary embodiments as described above, the three-dimensional experience may be increased through crosstalk reduction of the glasses-free 3D display.

The method of controlling a multi-view image display apparatus according to various exemplary embodiments may be implemented as a program so as to be provided to a display apparatus.

For example, a non-transitory computer-readable storage medium in which a program to perform a step of determining at least two views that will be provided as images for the user's left and right eyes from among the multi-views, based on the tracked position of a user's face, and a step of compensating for crosstalk by applying a predetermined weight to the at least two determined views by using a crosstalk matrix defining the crosstalk that occurs between the multi-view images is stored, may be provided.

Contrary to a medium to store data for a short moment, such as a register, a cache, a memory, etc., the non-transitory computer-readable storage medium refers to a medium that can store data in a semi-permanent manner and that can be read by devices. In particular, the above-described various applications or programs may be stored in and provided with the non-transitory computer readable medium such as a CD, a DVD, a Hard Disc™, a Blu-ray disc, an USB, a memory card, a ROM, etc.

While exemplary embodiments have been described, additional variations and modifications of the exemplary embodiments may occur to those skilled in the art once they learn of the basic inventive concepts. Therefore, it is intended that the appended claims shall be construed to include both the above exemplary embodiments and all such variations and modifications that fall within the spirit and scope of the inventive concept.

What is claimed is:

1. A multi-view image display apparatus comprising:
a tracker configured to track a position of a user's face according to a movement of the user; and
a processor configured to compensate for crosstalk with respect to multi-view image comprising a plurality of views using a crosstalk matrix defining the crosstalk that occurs between different views,
wherein the processor determines at least two views from among the plurality of views to be provided to the user's left and right eyes, based on the tracked position of the user's face and compensates for the crosstalk by applying a weight matrix that applies a predetermined weight to the at least two views to an inverse matrix of the crosstalk matrix, and
wherein the predetermined weight applied to the at least two views is higher than a weight which is applied to at least one remaining view among the plurality of views; and
a display configured to display the compensated multi-view image.

2. The multi-view image display apparatus of claim 1, wherein
the processor determines the at least two views to be provided as the images for the user's left and right eyes, based on the tracked position of the user's face and a viewing distance.

3. The multi-view image display apparatus of claim 1, wherein
the processor compensates for the crosstalk that occurs between the multi-view images by multiplying the inverse matrix of the crosstalk matrix to a pixel matrix comprising pixel values of the multi-view images.

4. The multi-view image display apparatus of claim 1, wherein
the processor compensates for the crosstalk using the weight matrix that is configured to apply a predetermined weight to a different number of views depending on a viewing distance to the inverse matrix of the crosstalk matrix.

5. The multi-view image display apparatus of claim 1, wherein
the processor compensates for the crosstalk by applying a weight matrix to the inverse matrix of the crosstalk matrix, that is configured to apply a predetermined weight to at least four views to be provided as images for left and right eyes of each of a plurality of users in response to there being the plurality of users.

6. The multi-view image display apparatus of claim 1, wherein
the crosstalk matrix comprises a matrix that is predefined by considering characteristics of the display.

7. A method of controlling a multi-view image display apparatus, the control method comprising:
tracking a position of a user's face according to a movement of the user;
determining at least two views from among a plurality of views to be provided to left and right eyes of the user based on the tracked position of the user's face;
compensating for crosstalk by applying a weight matrix that applies a predetermined weight to the at least two views to an inverse matrix of a crosstalk matrix which defines the crosstalk with respect to multi-view images, wherein the predetermined weight applied to the at least two views is higher than a weight which is applied to at least one remaining view among the plurality of views; and
displaying the compensated multi-view image.

8. The control method of claim 7, wherein
the compensating for the crosstalk comprises determining the at least two views that will be provided as the images for the left and right eyes of the user based on the tracked position of the user's face and a viewing distance, and compensating for the crosstalk by applying the predetermined weight to the at least two determined views.

9. The control method of claim 7, wherein
the compensating for the crosstalk comprises compensating for the crosstalk that occurs between the multi-view images by multiplying the inverse matrix of the crosstalk matrix to a pixel matrix which comprises pixel values of the multi-view images.

10. The control method of claim 7, wherein
the compensating for the crosstalk comprises compensating for the crosstalk by applying a weight matrix that applies a predetermined weight to a different number of views, depending on a viewing distance to the inverse matrix of the crosstalk matrix.

11. The control method of claim 7, wherein
the compensating for the crosstalk comprises compensating for the crosstalk by in response to there being a plurality of users, using a weight matrix that applies a predetermined weight to at least four views to be provided as images for left and right eyes of each of the plurality of users to the inverse matrix of the crosstalk matrix.

12. The control method of claim 7, wherein
the crosstalk matrix comprises a matrix that is predefined by considering characteristics of a display on which the multi-view images are displayed.

13. A multi-view image display apparatus comprising:
a crosstalk compensator configured to compensate for crosstalk with respect to multi-view images by using a crosstalk matrix which defines the crosstalk that occurs between the multi-view images;
a tracker configured to track a position of a user's face according to a movement of the user; and
a controller configured to determine at least two views from among multi-views to be provided as images for a user's left and right eyes, based on the tracked position of the user's face, and to control the crosstalk compensator to compensate for the crosstalk by applying a weight matrix which applies a predetermined weight to the at least two views to an inverse matrix of the crosstalk matrix,
wherein the predetermined weight applied to the at least two views is higher than a weight which is applied to at least one remaining view among the multi-views.

14. The multi-view image display apparatus of claim 13, wherein the crosstalk compensator compensates for the crosstalk that occurs between the multi-view images by multiplying the inverse matrix of the crosstalk matrix to a pixel matrix comprising pixel values of the multi-view images.

\* \* \* \* \*